US 12,292,758 B2

(12) United States Patent
Kim et al.

(10) Patent No.: US 12,292,758 B2
(45) Date of Patent: May 6, 2025

(54) PEDAL SIMULATOR

(71) Applicant: HYUNDAI MOBIS CO., LTD., Seoul (KR)

(72) Inventors: Jin Hyun Kim, Yongin-si (KR); Myeon Gyu Cha, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 10 days.

(21) Appl. No.: 18/238,163

(22) Filed: Aug. 25, 2023

(65) Prior Publication Data

US 2024/0134409 A1 Apr. 25, 2024
US 2024/0231413 A9 Jul. 11, 2024

(30) Foreign Application Priority Data

Oct. 19, 2022 (KR) .......................... 10-2022-0134950

(51) Int. Cl.
*G05G 5/03* (2008.04)
*G05G 1/44* (2008.04)
*B60T 7/04* (2006.01)

(52) U.S. Cl.
CPC ............... *G05G 5/03* (2013.01); *G05G 1/44* (2013.01); *B60T 7/04* (2013.01)

(58) Field of Classification Search
CPC .... G05G 5/03; G05G 1/44; B60T 7/04; B60T 8/4086; B60T 11/18; B60T 7/042
See application file for complete search history.

(56) References Cited

U.S. PATENT DOCUMENTS

| | | | | |
|---|---|---|---|---|
| 2010/0012442 | A1* | 1/2010 | Koo | G05G 5/03 |
| | | | | 188/72.9 |
| 2022/0332297 | A1* | 10/2022 | Eriksen | B60T 7/04 |
| 2023/0033895 | A1* | 2/2023 | Janson | B60T 7/06 |
| 2023/0409070 | A1* | 12/2023 | Kim | B60T 7/06 |
| 2024/0227747 | A1* | 7/2024 | Kim | B60T 7/06 |
| 2024/0326763 | A1* | 10/2024 | Bae | B60T 8/409 |

FOREIGN PATENT DOCUMENTS

| | | | | |
|---|---|---|---|---|
| EP | 4289690 A1 | * | 12/2023 | ................. B60T 7/04 |
| JP | 2017185836 A | * | 10/2017 | ................. B60T 8/17 |
| KR | 20110021357 A | * | 3/2011 | ............ B60T 8/4081 |
| KR | 10-2223847 B1 | | 3/2021 | |

OTHER PUBLICATIONS

Translation of KR 20110021357 A, Mar. 4, 2011, Koo et al. (Year: 2011).*
Translation of JP-2017185836-A, Oct. 12, 2017, Azuma et al. (Year: 2017).*

* cited by examiner

*Primary Examiner* — Vinh Luong
(74) *Attorney, Agent, or Firm* — Morgan, Lewis & Bockius LLP

(57) ABSTRACT

A pedal simulator includes a pedal housing, a pedal unit rotatably mounted to the pedal housing, and a simulator unit mounted in the pedal housing and configured to compress a plurality of rods connected to the pedal unit by pressing the pedal unit.

16 Claims, 10 Drawing Sheets

PEDAL SIMULATOR

CROSS-REFERENCE TO RELATED APPLICATION

This application claims the benefit under 35 U.S.C. § 119(a) of priority to Korean Patent Application No. 10-2022-0134950, filed on Oct. 19, 2022 in the Korean Intellectual Property Office, the entire disclosure of which is incorporated herein by reference for all purposes.

BACKGROUND

Field

Exemplary embodiments of the present disclosure relate to a pedal simulator, and more particularly, to a pedal simulator capable of enhancing the operability of parallel pedals.

Discussion of the Background

A pedal simulator is mounted on an electro-mechanical brake (EMB) to provide a driver with a feeling of braking generated from an existing mechanical brake.

Conventionally, the EMB uses a hydraulic system. However, with the emergence of technologies related to brake-by-wire systems and autonomous vehicles in recent years, the development of non-hydraulic braking systems has been required.

A non-hydraulic pedal simulator has been designed to provide a driver with the same feeling of braking as in an existing hydraulic system. This is different from a hydraulic pedal simulator in that it must fully implement a feeling of braking with only springs and dampers because it does not use brake oil. The e-pedal assembly is a unitary part of brake pedal, sensor, and pedal simulator integrated with one another.

Conventionally, the pedal simulator has a parallel structure. In this structure of the pedal simulator, however, an integral rod may be inoperable due to generation of moment if the reaction forces of both chambers are significantly different. Therefore, there is a need to address such an issue.

The related art of the present disclosure is disclosed in Korean Patent No. 10-2223847 (published on Feb. 26, 2021, entitled "PEDAL SIMULATOR").

SUMMARY

Various embodiments are directed to a pedal simulator capable of enhancing the operability of parallel pedals.

In an embodiment, there is provided a pedal simulator that includes a pedal housing, a pedal unit rotatably mounted to the pedal housing, and a simulator unit mounted in the pedal housing and configured to compress a plurality of rods connected to the pedal unit by pressing the pedal unit.

The simulator unit may include a simulator housing mounted in the pedal housing, a pair of piston sections mounted in the simulator housing and movable therein, a damper section mounted to face the piston sections in the simulator housing and compressed by moving the piston sections, and a transmission section configured to connect the pair of piston sections and mounted on the pedal unit, the transmission section being configured to transmit pressing of the pedal unit to the piston sections.

The transmission section may include a balance bar configured to connect the pair of piston sections and mounted on the pedal unit, the balance bar being in the form of a bar, a balance fixing nut mounted on each end of the balance bar, and a balance bar guide configured to surround an outer surface of the balance bar and to abut the pedal unit.

The balance bar guide may be made of an elastically deformable material.

The piston sections may include a pair of actuation rods connected to the transmission section, a first piston rod mounted on one of the pair of actuation rods and configured to press one component of the damper section, and a second piston rod mounted on the other of the pair of actuation rods and configured to press the other component of the damper section.

The first piston rod may include a first piston rod body slidably mounted in the simulator housing and configured to accommodate one of the pair of actuation rods and to press one component of the damper section, a first piston rod fixing part configured to fix one of the pair of actuation rods to the first piston rod body, and a first piston rod O-ring mounted on an outer surface of the first piston rod body and configured to abut an inner surface of the simulator housing, the first piston rod O-ring being made of an elastically deformable material.

The second piston rod may include a second piston rod body slidably mounted in the simulator housing and configured to accommodate, at one side thereof, the other of the pair of actuation rods and to accommodate, at the other side thereof, the other component of the damper section, and a second piston rod fixing part configured to fix the other of the pair of actuation rods to the second piston rod body.

The first piston rod body and the second piston rod body may have different lengths.

The damper section may include a first damper disposed to face the first piston rod body in the simulator housing, and a second damper mounted on the second piston rod body.

The first damper may include a first damper body mounted in the simulator housing, a magnet mounted on the first damper body and configured to measure position information of the first piston rod body, and a spring configured to abut, at one side thereof, the first damper body and to abut, at the other side thereof, the first piston rod body, and elastically deformed by the first piston rod body.

The second damper may be made of an elastically deformable material and be coupled to the second piston rod body by press-fitting.

The first and second piston rod fixing parts may surround outer surfaces of the actuation rods so as to rotate ends of the actuation rods.

The pedal housing may include a pedal housing body, a pedal housing receptacle formed to accommodate the simulator unit in the pedal housing body, a pedal housing hole formed in the pedal housing body therethrough, and a rotation support mounted to the pedal unit through the pedal housing hole to rotatably support the pedal unit.

The rotation support may include a rotation support bar mounted to the pedal unit through the pedal housing hole to rotatably support the pedal unit, the rotation support bar being in the form of a bar, a rotation support fixing nut mounted on the rotation support bar, and a rotation support bar guide configured to surround an outer surface of the rotation support bar and to abut the pedal unit.

The rotation support bar guide may be made of an elastically deformable material.

The pedal unit may include a pedal body, a first pedal body hole formed at one side of the pedal body therethrough, the rotation support being inserted into the first pedal body hole, and a second pedal body hole formed at the other side of the pedal body therethrough and connected to the simulator unit.

DETAILED DESCRIPTION OF THE ILLUSTRATED EMBODIMENTS

Hereinafter, a pedal simulator according to exemplary embodiments of the present disclosure will be described in detail with reference to the accompanying drawings. It should be considered that the thickness of each line or the size of each component in the drawings may be exaggeratedly illustrated for clarity and convenience of description.

In addition, the terms used herein are terms defined in consideration of functions of the present disclosure, and these terms may change depending on the intention or practice of a user or an operator. Therefore, these terms should be defined based on the entirety of the disclosure set forth herein.

Figure 1:
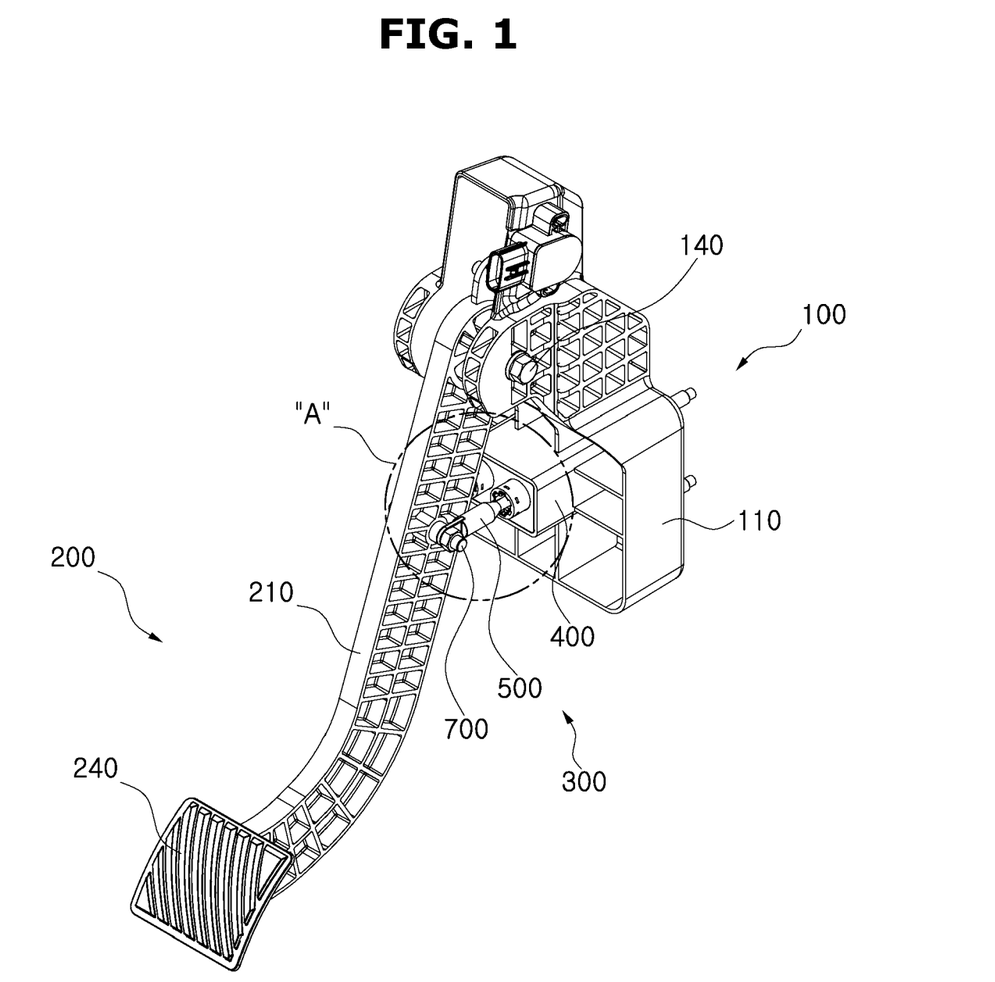
FIG. 1 is a perspective view schematically illustrating a pedal simulator according to an embodiment of the present disclosure.
Figure 2:
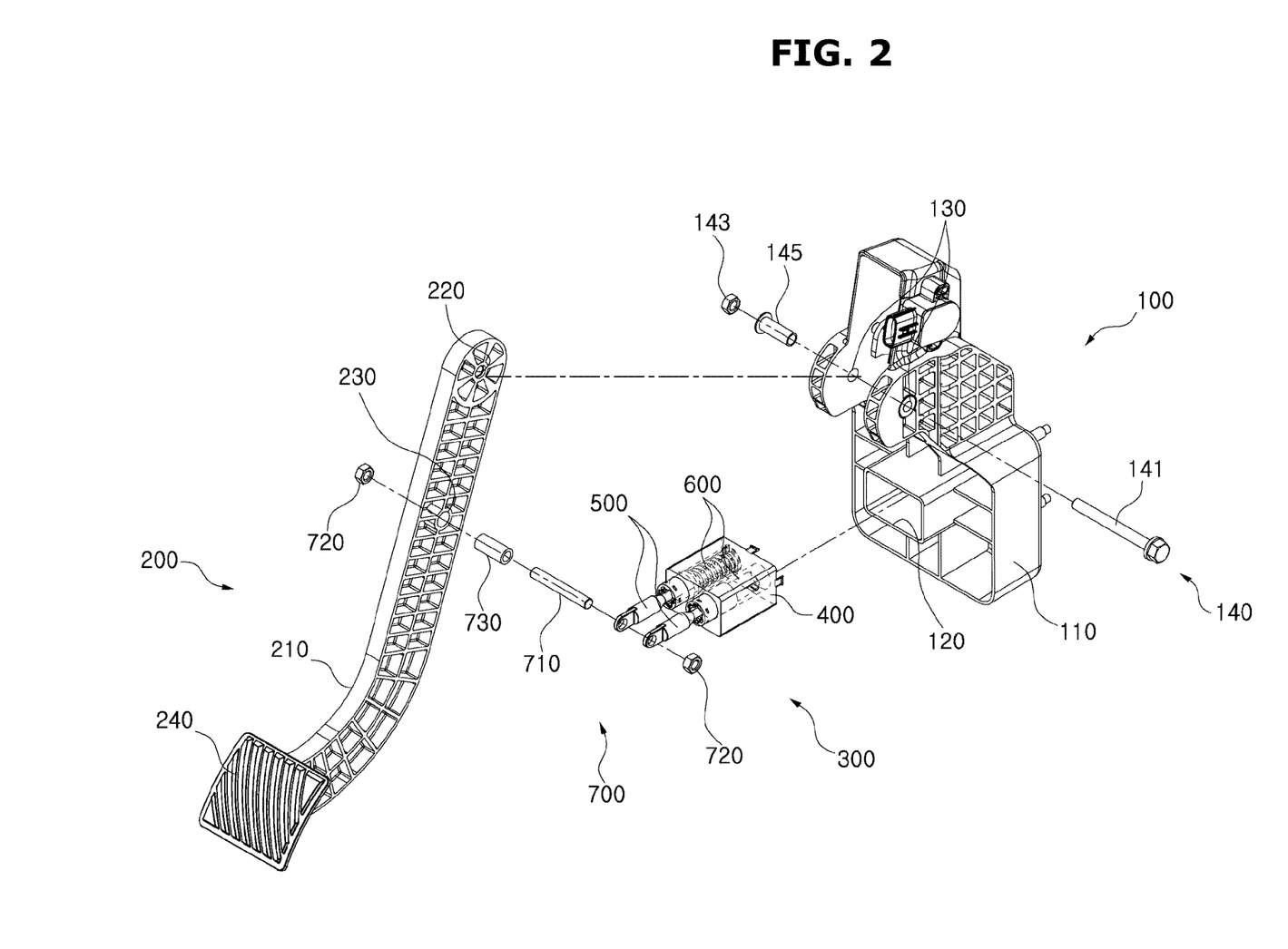
FIG. 2 is an exploded perspective view schematically illustrating the pedal simulator according to the embodiment of the present disclosure.
Figure 3:
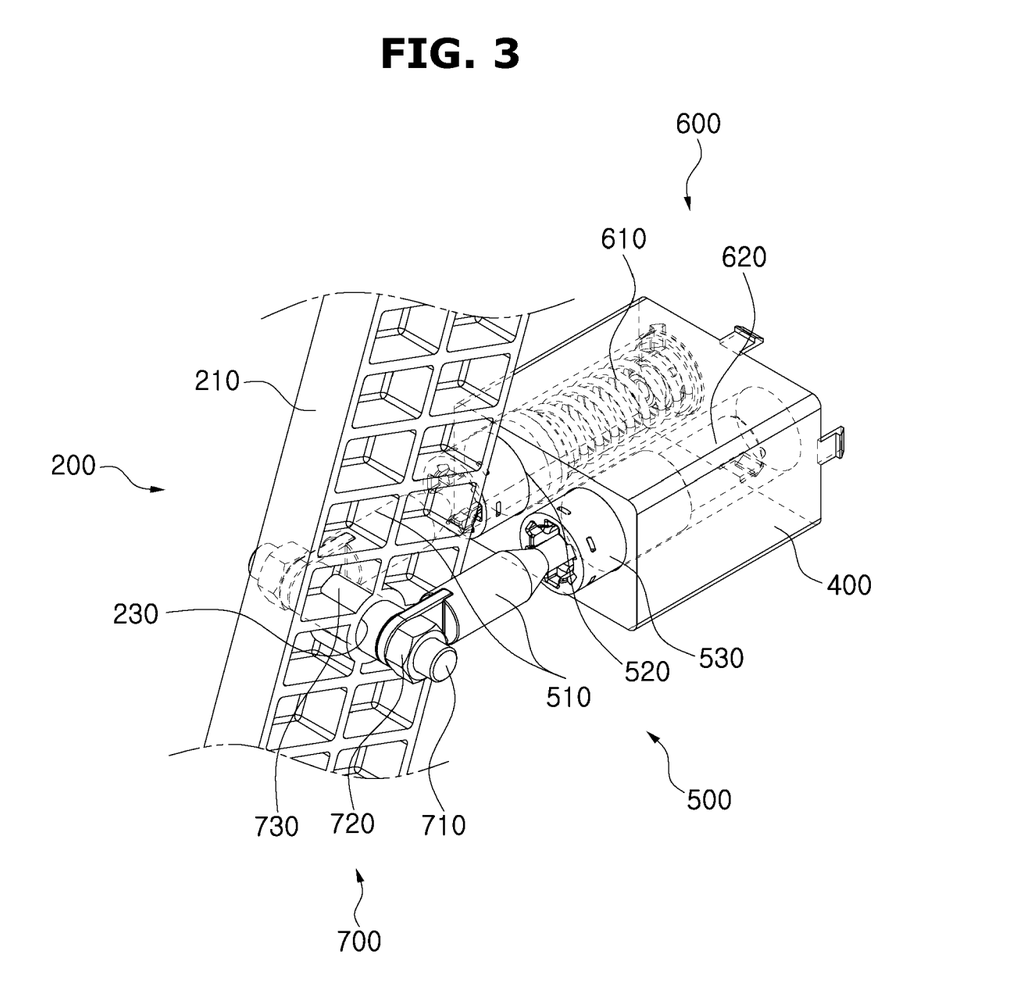
FIG. 3 is an enlarged perspective view schematically illustrating portion "A" of FIG. 1.
Figure 4:
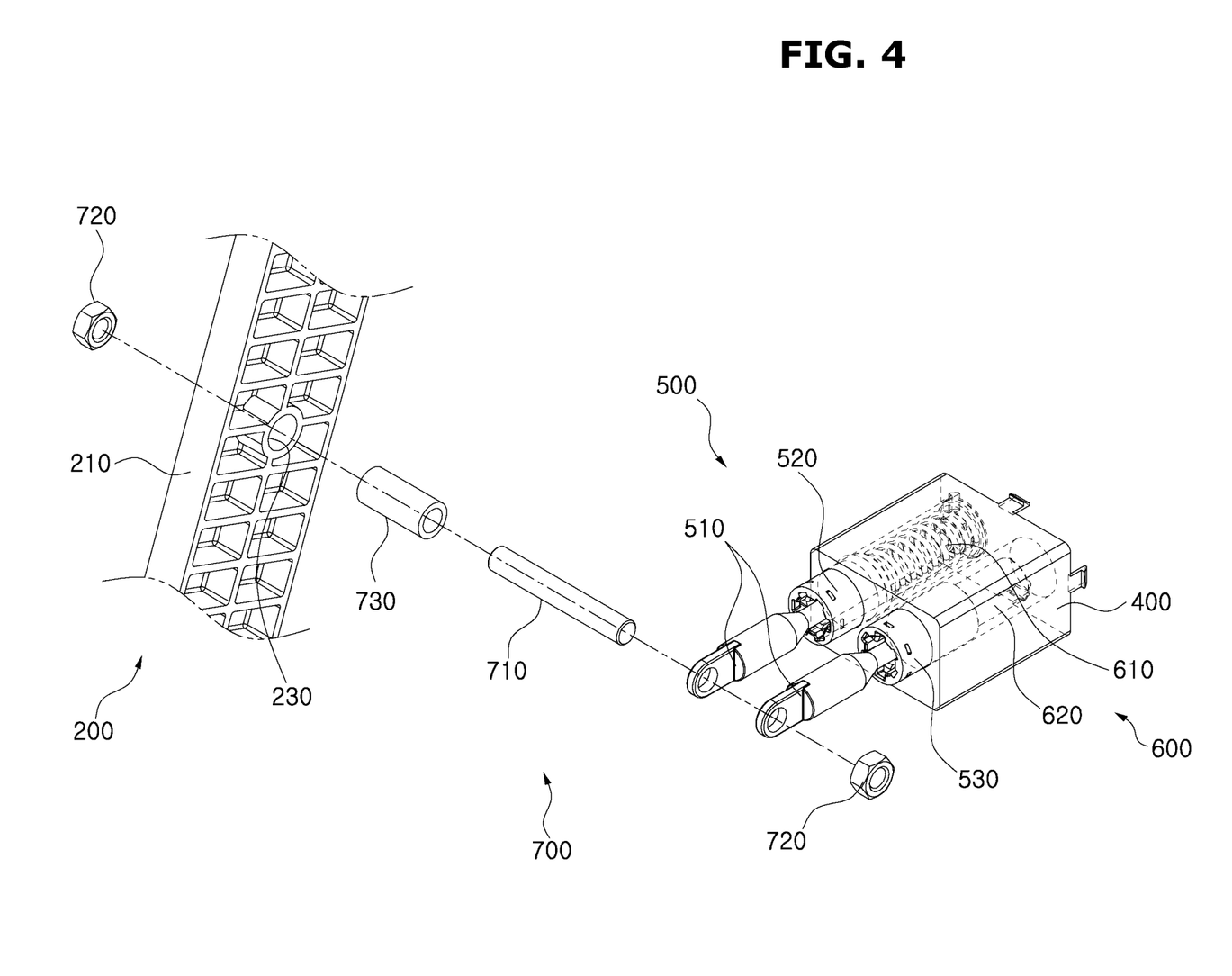
FIG. 4 is an exploded perspective view of FIG. 3.
Figure 5:
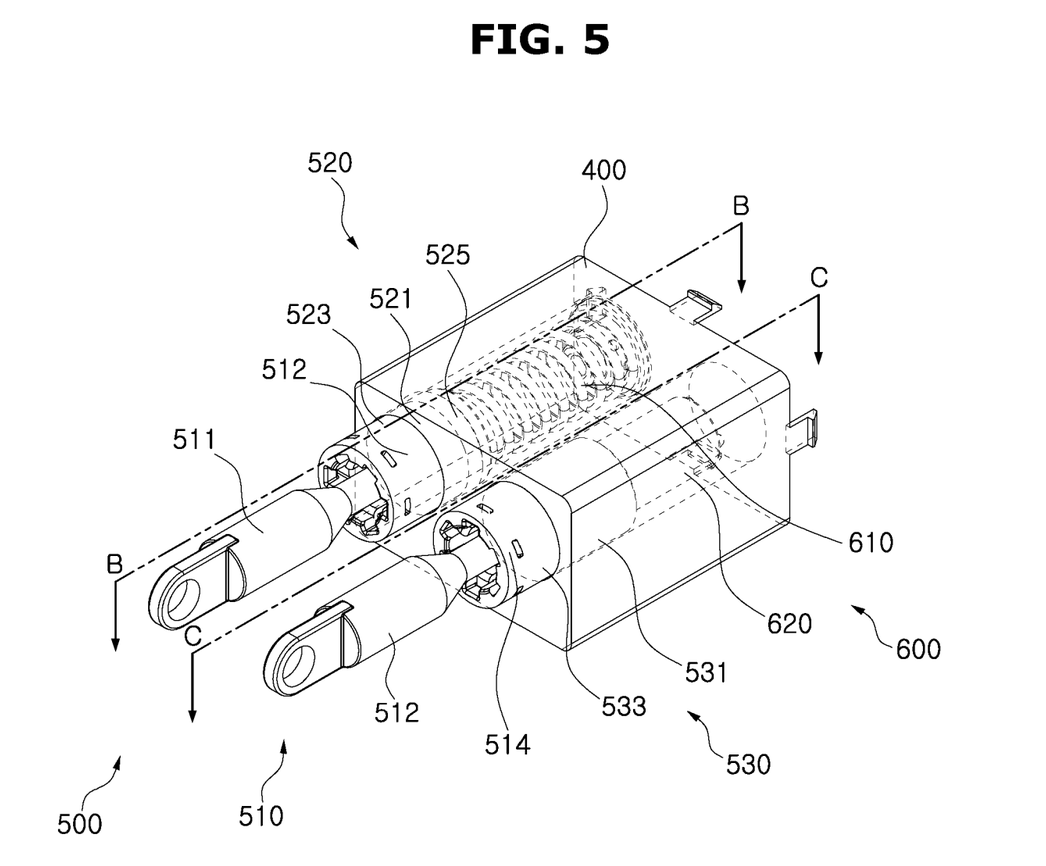
FIG. 5 is a perspective view schematically illustrating a piston section according to the embodiment of the present disclosure.
Figure 6:
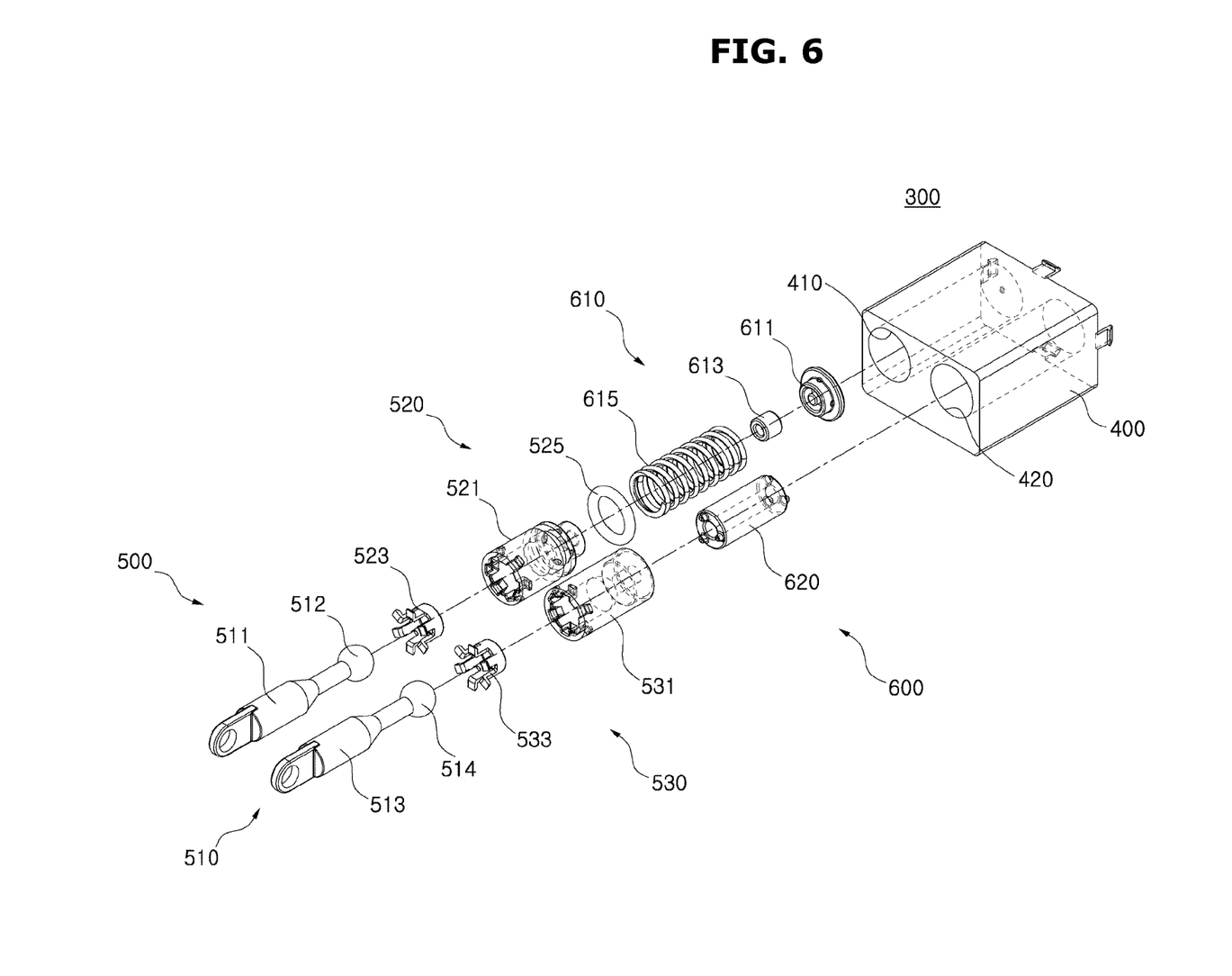
FIG. 6 is an exploded perspective view schematically illustrating the piston section according to the embodiment of the present disclosure.
Figure 7:
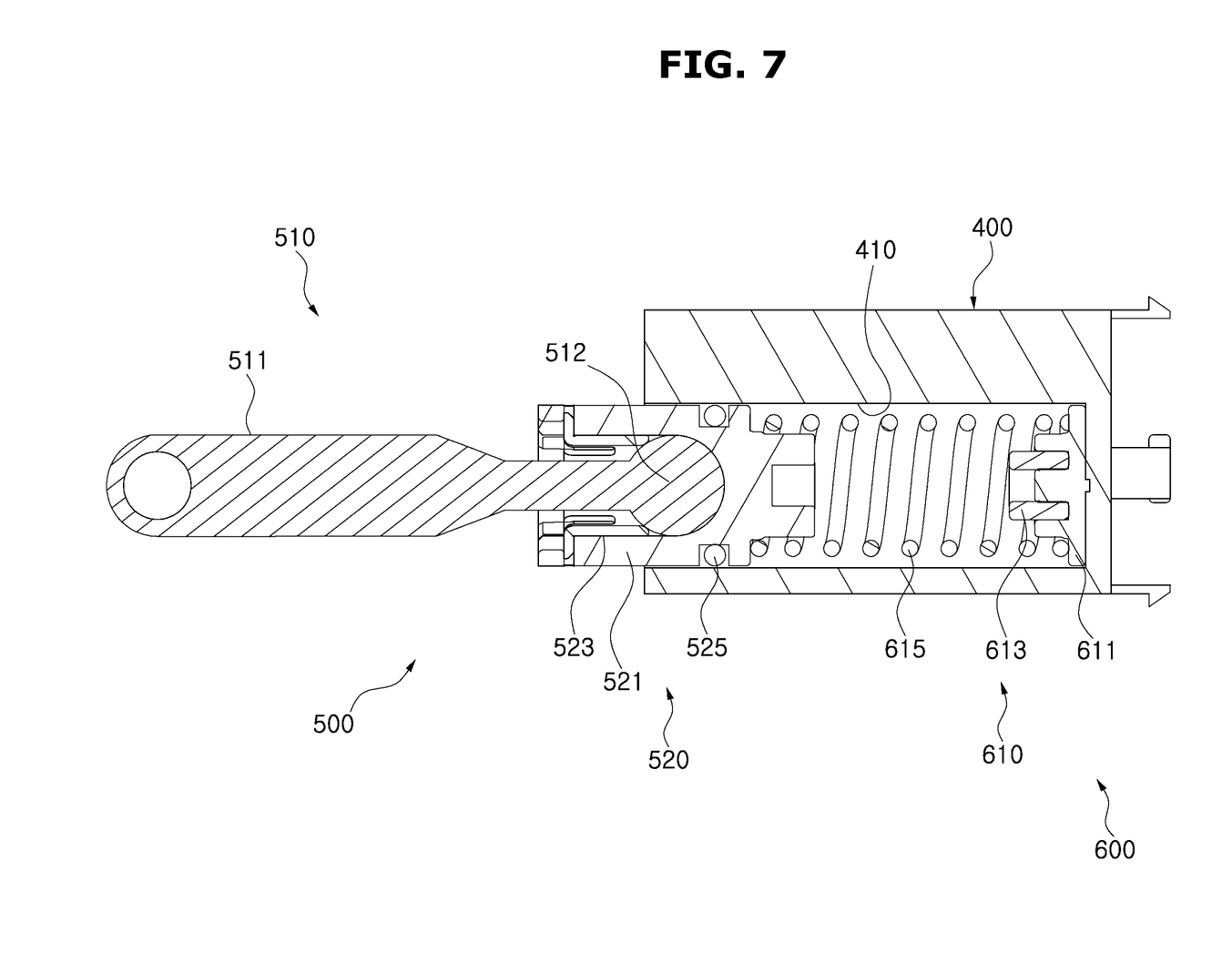
FIG. 7 is a cross-sectional view taken along line B-B of FIG. 5.
Figure 8:
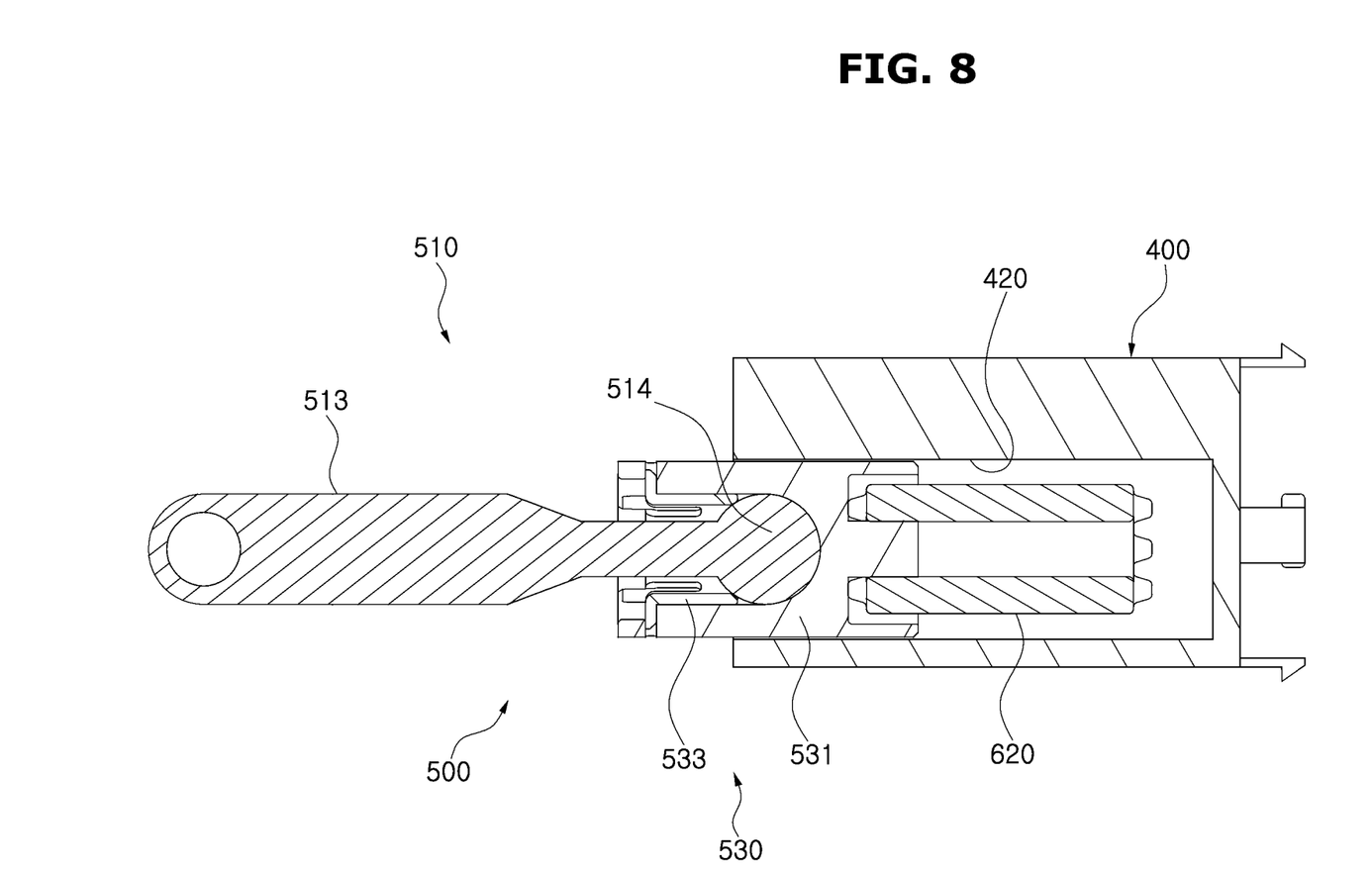
FIG. 8 is a cross-sectional view taken along line C-C of FIG. 5.
Figure 9:
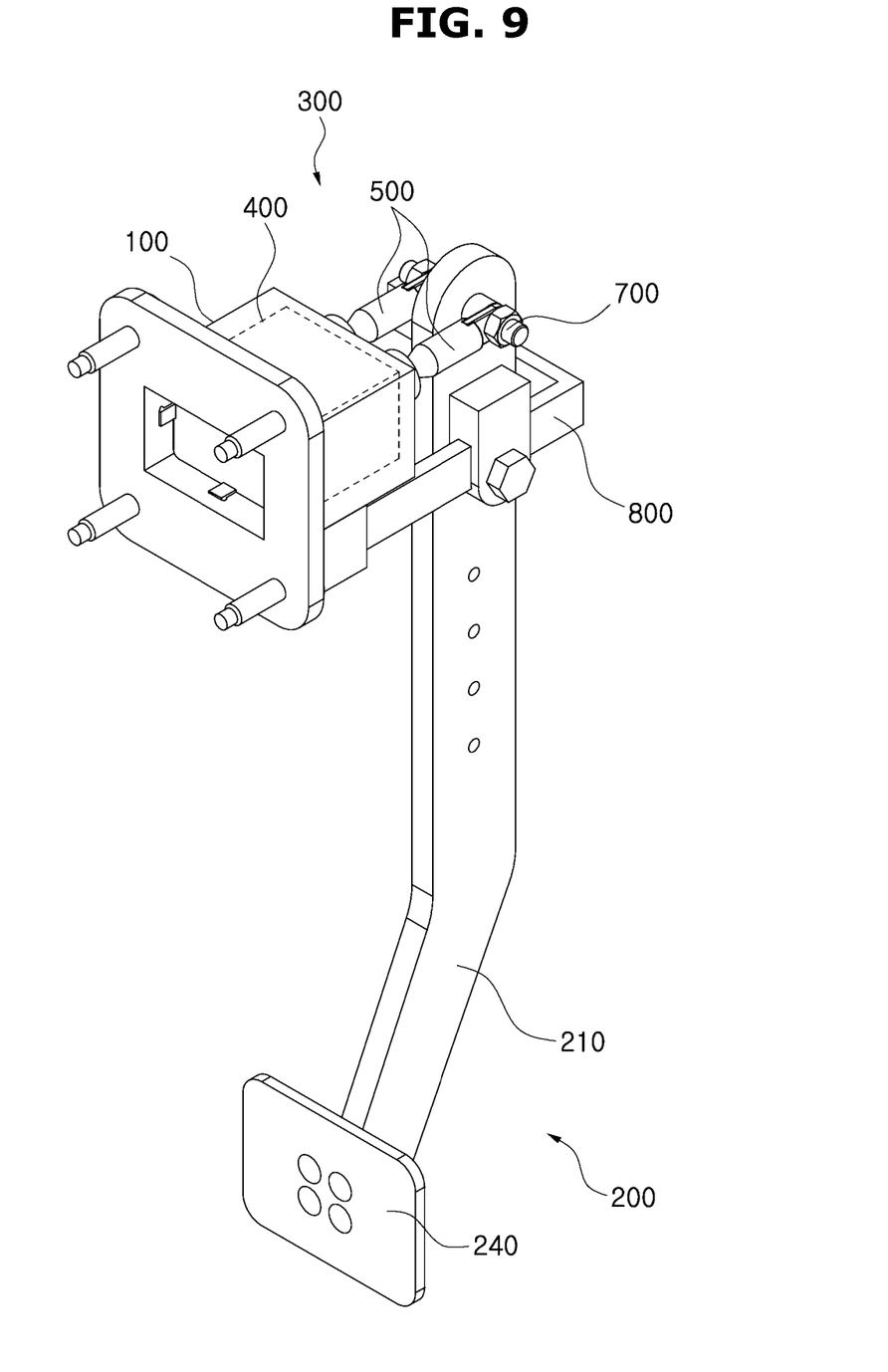
FIG. 9 is a perspective view schematically illustrating a pedal simulator according to another embodiment of the present disclosure.
Figure 10:
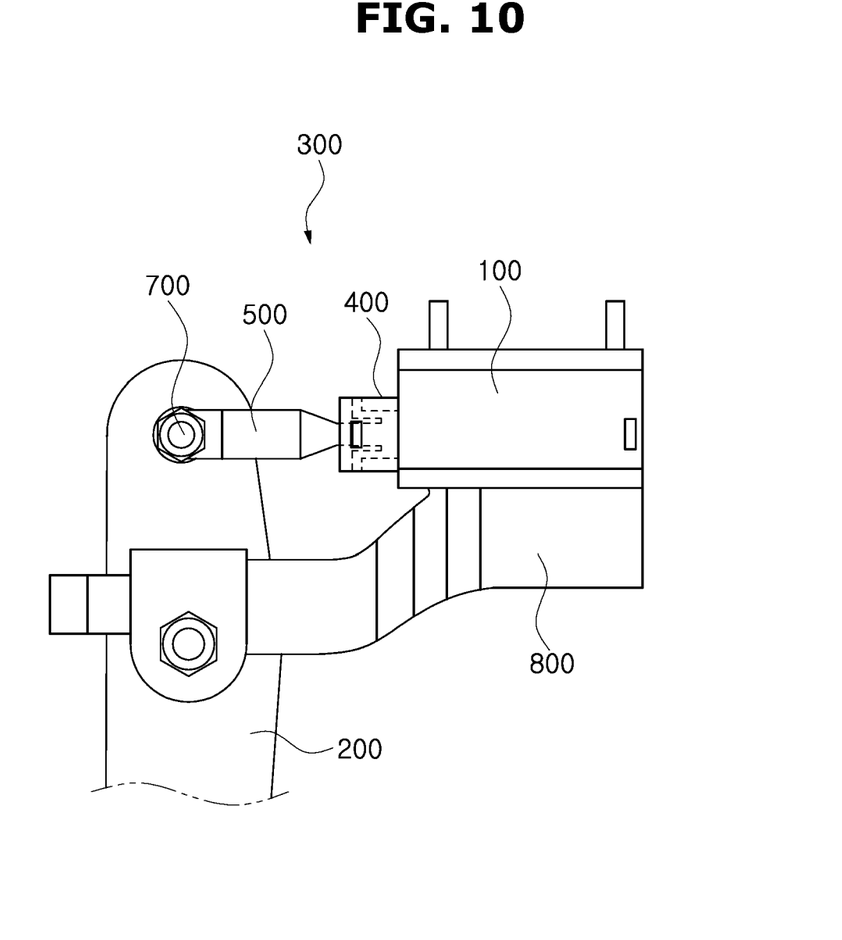
FIG. 10 is a perspective view schematically illustrating a pedal simulator according to a further embodiment of the present disclosure.

FIG. 1 is a perspective view schematically illustrating a pedal simulator according to an embodiment of the present disclosure. FIG. 2 is an exploded perspective view schematically illustrating the pedal simulator according to the embodiment of the present disclosure. FIG. 3 is an enlarged perspective view schematically illustrating portion "A" of FIG. 1. FIG. 4 is an exploded perspective view of FIG. 3. FIG. 5 is a perspective view schematically illustrating a piston section according to the embodiment of the present disclosure. FIG. 6 is an exploded perspective view schematically illustrating the piston section according to the embodiment of the present disclosure. FIG. 7 is a cross-sectional view taken along line B-B of FIG. 5. FIG. 8 is a cross-sectional view taken along line C-C of FIG. 5. FIG. 9 is a perspective view schematically illustrating a pedal simulator according to another embodiment of the present disclosure. FIG. 10 is a perspective view schematically illustrating a pedal simulator according to a further embodiment of the present disclosure.

Referring to FIGS. 1 to 8, the pedal simulator according to the embodiment of the present disclosure may include a pedal housing 100, a pedal unit 200, and a simulator unit 300.

The pedal housing 100 accommodates the simulator unit 300 therein and rotatably supports the pedal unit 200. The pedal housing 100 may include a pedal housing body 110, a pedal housing receptacle 120, a pedal housing hole 130, and a rotation support 140.

The pedal housing body 110 rotatably supports the pedal unit 200 at one side (upper side in FIG. 2) thereof. The pedal housing receptacle 120 is formed to accommodate the simulator unit 300 in the pedal housing body 110. The pedal housing receptacle 120 is sized to accommodate a simulator housing 400 of the simulator unit 300. The pedal housing receptacle 120 is open on one surface (front surface in FIG. 2) thereof.

The pedal housing hole 130 is formed in the pedal housing body 110 therethrough. A rotation support bar 141 of the rotation support 140 is inserted into the pedal housing hole 130. The pedal housing hole 130 has an inner diameter that is equal to or larger than the outer diameter of the rotation support bar 141 of the rotation support 140.

The rotation support 140 is mounted to the pedal unit 200 through the pedal housing hole 130 to rotatably support the pedal unit 200. The rotation support 140 may include a rotation support bar 141, a rotation support fixing nut 143, and a rotation support bar guide 145.

The rotation support bar 141 is in the form of a bar that is mounted through the pedal housing hole 130 and a first pedal body hole 220 of the pedal unit 200 to rotatably support the pedal unit 200. The rotation support bar 141 has a thread formed on the end (left end in FIG. 2) thereof and is screwed with the rotation support fixing nut 143.

The rotation support fixing nut 143 is mounted on the end (left end in FIG. 2) of the rotation support bar 141. The rotation support fixing nut 143 has a thread formed on the inner surface thereof and is screwed to the end of the rotation support bar 141.

The rotation support bar guide 145 surrounds the outer surface of the rotation support bar 141 and abuts the pedal unit 200. The rotation support bar guide 145 is interposed and in close contact between the rotation support bar 141 and the pedal unit 200. The rotation support bar guide 145 is in close contact between the rotation support bar 141 and the pedal unit 200 to prevent foreign substances from entering therebetween.

The rotation support bar guide 145 may be made of an elastically deformable material. The rotation support bar guide 145 may be made of an elastically deformable material to prevent noise from occurring between the rotation support bar 141 and the pedal unit 200 and to absorb the moment of the rotation support bar 141. The rotation support bar guide 145 may be made of an elastically deformable material including rubber, silicon, or the like.

The pedal unit 200 is rotatably mounted on the pedal housing 100. The pedal unit 200 may include a pedal body 210, a first pedal body hole 220, and a second pedal body hole 230.

The pedal body 210 is rotatably mounted on the pedal housing 100. The first pedal body hole 220 is formed at one side (upper side in FIG. 2) of the pedal body 210 therethrough, and the rotation support 140 is inserted into the first pedal body hole 220.

The second pedal body hole 230 is formed at the other side (center side in FIG. 2) of the pedal body 210 therethrough, and is connected to a balance bar 710 of a transmission section 700 of the simulator unit 300.

The pedal unit 200 may further include a pedal 240. The pedal 240 is formed beneath the pedal body 210. When a user presses the pedal 240, the pedal body 210 may be rotated.

The simulator unit 300 is mounted in the pedal housing 100, and a plurality of rods connected to the pedal unit 200 are compressed by pressing the pedal unit 200. The simulator unit 300 may include a simulator housing 400, a piston section 500, a damper section 600, and a transmission section 700.

The simulator housing 400 is mounted in the pedal housing receptacle 120 of the pedal housing 100. The simulator housing 400 is formed to correspond to the size of the pedal housing receptacle 120. The simulator housing 400 may be coupled to the pedal housing receptacle 120 by press-fitting, bolting, bonding, or the like. The simulator housing 400 includes a first receptacle 410 and a second receptacle 420. A first damper 610 may be mounted in the first receptacle 410, and a first piston rod 520 may be moved in the first receptacle 410. A second damper 620 may be mounted in the second receptacle 420, and a second piston rod 530 may be moved in the second receptacle 420.

The piston section 500 may consist of a pair of piston sections that are mounted in the simulator housing 400 and are movable in the simulator housing 400. Each of the piston sections 500 may include an actuation rod 510, a first piston rod 520, and a second piston rod 530.

The actuation rod 510 may consist of a pair of actuation rods connected to the transmission section 700. The pair of actuation rods 510 include a first actuation rod 511 and a second actuation rod 513. The first actuation rod 511 and the second actuation rod 513 are connected to both sides of the pedal body 210 by the transmission section 700.

A first actuation rotary part 512 and a second actuation rotary part 514, each having a ball shape, are mounted at the ends of the first and second actuation rods 511 and 513, respectively. The first and second actuation rotary parts 512 and 514 are rotatably mounted on a first piston rod fixing part 523 of the first piston rod 520 and a second piston rod fixing part 533 of the second piston rod 530, respectively.

The first piston rod 520 is mounted on one of the pair of actuation rods 510 and presses one component of the damper section 600. The first piston rod 520 is mounted on the first actuation rod 511 of the pair of actuation rods 510 and presses a first damper 610 of the damper section 600.

The first piston rod 520 may include a first piston rod body 521, a first piston rod fixing part 523, and a first piston rod O-ring 525. The first piston rod body 521 is slidably mounted in the simulator housing 400, accommodates the first actuation rod 511, which is one of the pair of actuation rods 510, and presses the first damper 610, which is one component of the damper section 600.

The first piston rod fixing part 523 fixes the first actuation rod 511, which is one of the pair of actuation rods 510, to the first piston rod body 521. The first piston rod fixing part 523 surrounds and accommodates the first actuation rotary part 512 of the first actuation rod 511 therein, and is coupled to the outer surface of the first actuation rod 511 by caulking.

The first piston rod O-ring 525 is mounted on the outer surface of the first piston rod body 521, abuts the inner surface of the simulator housing 400, and is made of an elastically deformable material. The first piston rod O-ring 525 is made of an elastically deformable material to prevent foreign substances from entering between the first piston rod body 521 and the simulator housing 400. The first piston rod O-ring 525 may be made of an elastically deformable material including rubber, silicon, or the like.

The second piston rod 530 is mounted on the other of the pair of actuation rods 510 and presses the other component of the damper section 600. The second piston rod 530 is mounted on the second actuation rod 513 of the pair of actuation rods 510 and presses a second damper 620 of the damper section 600.

The second piston rod 530 may include a second piston rod body 531 and a second piston rod fixing part 533. The second piston rod body 531 is slidably mounted in the simulator housing 400. The second piston rod body 531 accommodates, at one side (left side in FIG. 8) thereof, the second actuation rod 513, which is the other of the pair of actuation rods 510, and accommodates, at the other side (right side in FIG. 8) thereof, the second damper 620, which is the other component of the damper section 600.

The second piston rod fixing part 533 fixes the second actuation rod 513, which is the other of the pair of actuation rods 510, to the second piston rod body 531. The second piston rod fixing part 533 surrounds and accommodates the second actuation rotary part 514 of the second actuation rod 513 therein, and is coupled to the outer surface of the second actuation rod 513 by caulking.

The first and second piston rod fixing parts 523 and 533 surround the outer surfaces of the first and second actuation rods 511 and 513 of the pair of actuation rods 510 so as to rotate the first and second actuation rotary parts 512 and 514, which are the ends of the first and second actuation rods 511 and 513 of the pair of actuation rods 510. The first and second piston rod fixing parts 523 and 533 are coupled to the outer surfaces of the first and second actuation rods 511 and 513 by caulking.

The first piston rod body 521 and the second piston rod body 531 may have different lengths. The first piston rod body 521 and the second piston rod body 531 are spaced in parallel, and press the first damper 610 and the second damper 620, respectively.

The first piston rod body 521 and the second piston rod body 531 have different lengths so that the contact time and length of the first piston rod body 521 with the first damper 610 are different from the contact time and length of the second piston rod body 531 with the second damper 620, thereby allowing a user to receive different feelings of braking. Therefore, it is possible to provide an early and middle feeling of braking and a late feeling of braking.

The length of the first piston rod body 521 is less than the length of the second piston rod body 531. The first piston rod body 521 presses the first damper 610 of the damper section 600, and the second piston rod body 531 presses the second damper 620 of the damper section 600.

The first piston rod body 521 provides a user with an early and middle feeling of braking when pressing the first damper 610. On the other hand, the second piston rod body 531 provides a user with a late feeling of braking when pressing the second damper 620. The length of the first piston rod body 521 and the length of the second piston rod body 531 may be tuned to provide a user with a suitable feeling of braking.

The damper section 600 is mounted to face the piston section 500 in the simulator housing 400, and is compressed by moving the piston section 500. The damper section 600 may include the first damper 610 and the second damper 620. The elastically deformed distance of the first damper 610 may be relatively higher than that of the second damper 620.

The first damper 610 is disposed to face the first piston rod body 521 in the simulator housing 400. The first damper 610 includes a first damper body 611, a magnet 613, and a spring 617.

The first damper body 611 is mounted in the simulator housing 400. The first damper body 611 may be fixed to the simulator housing 400 by bolting, bonding, press-fitting, or the like.

The magnet 613 is mounted on the first damper body 611 and measures position information of the first piston rod body 521. The magnet 613 may be a magnet having magnetic force. The magnet 613 may transmit, to a controller (not shown), the pedal effort or position information of the first piston rod body 521 measured through a change in magnetic field depending on the movement of the magnet 613 by the first piston rod body 521.

The spring 617 abuts, at one side (right side in FIG. 7) thereof, the first damper body 611, and abuts, at the other side (left side in FIG. 7) thereof, the first piston rod body 521. The spring 617 is elastically deformed by the first piston rod body 521.

The spring 617 is interposed between the first damper body 611 and the first piston rod body 521, and is compressed by the first piston rod body 521 moving to the right. The compressed spring 617 provides elastic force (elastic restoring force) to the first piston rod body 521 to return the first piston rod body 521 to its original position. The spring 617 may be a coil spring.

The second damper 620 is mounted on the second piston rod body 531. The second damper 620 is made of an elastically deformable material and is coupled to the second piston rod body 531 by press-fitting. The second damper 620 is coupled to the second piston rod body 531 by press-fitting, and moves together with the second piston rod body 531 to abut one surface (right surface in FIG. 8) of the simulator housing 400. The second damper 620 may be made of an elastically deformable material including rubber, silicon, or the like.

The transmission section 700 connects the pair of piston sections 500, is mounted on the pedal unit 200, and transmits the pressing of the pedal unit 200 to the piston sections 500. The transmission section 700 includes a balance bar 710, a balance fixing nut 720, and a balance bar guide 730.

The balance bar 710 connects the pair of piston sections 500 and is in the form of a bar mounted on the pedal unit 200. The balance bar 710 connects the pair of actuation rods 510 of the pair of piston sections 500. That is, the balance bar 710 connects the first actuation rod 511 and the second actuation rod 513. The balance bar 710 connects the first and second actuation rods 511 and 513 to the pedal body 210. The balance bar 710 is inserted into the second pedal body hole 230.

The balance fixing nut 720 is mounted on each end of the balance bar 710. The balance bar 710 has a thread formed on each end thereof, and the balance fixing nut 720 has a thread formed on the inner surface thereof. The balance fixing nut 720 is screwed to the balance bar 710.

The balance bar guide 730 surrounds the outer surface of the balance bar 710 and abuts the pedal unit 200. The balance bar guide 730 is interposed and in close contact between the balance bar 710 and the second pedal body hole 230 of the pedal unit 200. The balance bar guide 730 is in close contact between the balance bar 710 and the second pedal body hole 230 of the pedal unit 200 to prevent foreign substances from entering therebetween.

The balance bar guide 730 may be made of an elastically deformable material. The balance bar guide 730 may be made of an elastically deformable material to prevent noise from occurring between the balance bar 710 and the second pedal body hole 230 of the pedal unit 200 and to absorb the moment of the balance bar 710. The balance bar guide 730 may be made of an elastically deformable material including rubber, silicon, or the like.

A pedal simulator according to further embodiments of the present disclosure will be described with reference to FIGS. 9 and 10. In the pedal simulator according to the above embodiment of the present disclosure, the pedal unit 200 and the simulator unit 300 operate in the same direction.

In the pedal simulator of FIGS. 9 and 10, a pedal unit 200 and a simulator unit 300 operate in different directions. The pedal unit 200 is connected to a pedal housing 100 by a connection section 800 formed of a frame, so that the pedal unit 200 and the simulator unit 300 may operate in different directions. The connection section 800 rotatably supports the pedal unit 200.

As illustrated in FIGS. 9 and 10, the pedal housing 100 may be rotated and accommodate an object to be mounted (not shown) thereon.

According to the pedal simulator of the present disclosure, it is possible to enhance the operability of the pedal unit and the simulator unit disposed in parallel.

In addition, it is possible to ensure smooth operability by evenly transmitting the pedal efforts of the plurality of piston sections through the transmission section to the damper section in the pedal simulator.

Moreover, it is possible to ensure smooth operability by evenly transmitting the pedal efforts of the plurality of piston sections through the transmission section to the damper section in the pedal simulator.

In addition, it is possible to ensure design flexibility by changing the position of the transmission section and applying it different types of pedal units in the pedal simulator.

In addition, the first piston rod and the second piston rod are formed to have different lengths, so that they can be tuned to properly provide a user with an early and middle feeling of braking and a late feeling of braking.

Furthermore, it is possible to reduce the volume of the simulator housing through the parallel structure of the first and second piston rods and the first and second dampers.

While the present disclosure has been described with respect to the embodiments illustrated in the drawings, it will be obvious to those skilled in the art that such embodiments are provided by way of example only. It will be understood by those skilled in the art that various modifications and other equivalent embodiments may be made without departing from the spirit and scope of the disclosure as defined in the following claims. Therefore, the technical protection scope of the present disclosure should be defined by the following claims.

What is claimed is:

1. A pedal simulator comprising:
   a pedal housing;
   a pedal unit rotatably mounted to the pedal housing; and
   a simulator unit mounted in the pedal housing and configured to compress a plurality of rods connected to the pedal unit by pressing the pedal unit, the simulator unit including:
   a simulator housing mounted in the pedal housing;
   a pair of piston sections mounted in the simulator housing and movable therein; and
   a transmission section coupled to an end of each of the pair of piston sections, respectively, and configured to connect the pair of piston sections.

2. The pedal simulator according to claim 1, wherein the simulator unit comprises:
a damper section mounted to face the pair of piston sections in the simulator housing and compressed by moving the pair of piston sections,
wherein the transmission section is configured to transmit pressing of the pedal unit to the piston sections.

3. The pedal simulator according to claim 2, wherein the transmission section comprises:
a balance bar configured to connect the pair of piston sections and mounted on the pedal unit, the balance bar being in the form of a bar;
a balance fixing nut mounted on each of two ends of the balance bar; and
a balance bar guide configured to surround an outer surface of the balance bar and to abut the pedal unit.

4. The pedal simulator according to claim 3, wherein the balance bar guide is made of an elastically deformable material.

5. The pedal simulator according to claim 2, wherein the pair of piston sections comprise:
a pair of actuation rods connected to the transmission section;
a first piston rod mounted on one of the pair of actuation rods and configured to press one component of the damper section; and
a second piston rod mounted on the other of the pair of actuation rods and configured to press the other component of the damper section.

6. The pedal simulator according to claim 5, wherein the first piston rod comprises:
a first piston rod body slidably mounted in the simulator housing and configured to accommodate the one of the pair of actuation rods and to press one component of the damper section;
a first piston rod fixing part configured to fix the one of the pair of actuation rods to the first piston rod body; and
a first piston rod O-ring mounted on an outer surface of the first piston rod body and configured to abut an inner surface of the simulator housing, the first piston rod O-ring being made of an elastically deformable material.

7. The pedal simulator according to claim 6, wherein the second piston rod comprises:
a second piston rod body slidably mounted in the simulator housing and configured to accommodate, at one side thereof, the other of the pair of actuation rods and to accommodate, at the other side thereof, the other component of the damper section; and
a second piston rod fixing part configured to fix the other of the pair of actuation rods to the second piston rod body.

8. The pedal simulator according to claim 7, wherein the first piston rod body and the second piston rod body have different lengths.

9. The pedal simulator according to claim 7, wherein the damper section comprises:
a first damper disposed to face the first piston rod body in the simulator housing; and
a second damper mounted on the second piston rod body.

10. The pedal simulator according to claim 9, wherein the first damper comprises:
a first damper body mounted in the simulator housing;
a magnet mounted on the first damper body and configured to measure position information of the first piston rod body; and
a spring configured to abut, at one side thereof, the first damper body and to abut, at the other side thereof, the first piston rod body, and elastically deformed by the first piston rod body.

11. The pedal simulator according to claim 9, wherein the second damper is made of an elastically deformable material and is coupled to the second piston rod body by press-fitting.

12. The pedal simulator according to claim 7, wherein the first and second piston rod fixing parts surround outer surfaces of the pair of actuation rods so as to rotate ends of the pair of actuation rods.

13. The pedal simulator according to claim 1, wherein the pedal housing comprises:
a pedal housing body;
a pedal housing receptacle formed to accommodate the simulator unit in the pedal housing body;
a pedal housing hole formed in the pedal housing body therethrough; and
a rotation support mounted to the pedal unit through the pedal housing hole to rotatably support the pedal unit.

14. The pedal simulator according to claim 13, wherein the rotation support comprises:
a rotation support bar mounted to the pedal unit through the pedal housing hole to rotatably support the pedal unit, the rotation support bar being in the form of a bar;
a rotation support fixing nut mounted on the rotation support bar; and
a rotation support bar guide configured to surround an outer surface of the rotation support bar and to abut the pedal unit.

15. The pedal simulator according to claim 14, wherein the rotation support bar guide is made of an elastically deformable material.

16. The pedal simulator according to claim 13, wherein the pedal unit comprises:
a pedal body;
a first pedal body hole formed at one side of the pedal body therethrough, the rotation support being inserted into the first pedal body hole; and
a second pedal body hole formed at the other side of the pedal body therethrough and connected to the simulator unit.

* * * * *